United States Patent [19]

Mori et al.

[11] Patent Number: 5,262,711
[45] Date of Patent: Nov. 16, 1993

[54] CHARGING GENERATOR FOR A VEHICLE INCLUDING A CIRCUIT FOR SUPPRESSING A SUDDEN CHANGE IN A FIELD CURRENT

[75] Inventors: Yuichi Mori; Keiichi Mashino, both of Katsuta; Atsushi Kanke; Katsuji Marumoto, both of Hitachi, all of Japan

[73] Assignee: Hitachi, Ltd., Tokyo, Japan

[21] Appl. No.: 689,528

[22] Filed: Apr. 23, 1991

[30] Foreign Application Priority Data

Apr. 27, 1990 [JP] Japan .................................. 2-110068

[51] Int. Cl.⁵ ............................................... H02J 7/14
[52] U.S. Cl. ........................................ 322/28; 322/73; 320/64
[58] Field of Search ...................... 322/7, 8, 10, 14, 15, 322/22, 23, 24, 25, 28, 29, 72, 73; 320/62, 64, 68

[56] References Cited

U.S. PATENT DOCUMENTS

| | | | |
|---|---|---|---|
| 3,820,009 | 6/1974 | Itoh et al. | 322/28 |
| 4,263,543 | 4/1981 | Watrous et al. | 322/8 |
| 4,280,087 | 7/1981 | Kasiewicz | 322/28 |
| 4,335,344 | 6/1982 | Gant | 322/28 X |
| 4,459,489 | 7/1984 | Kirk et al. | 290/13 |
| 4,629,968 | 12/1986 | Butts et al. | 322/29 |
| 4,634,954 | 1/1987 | Kato et al. | 322/28 |
| 4,636,706 | 1/1987 | Bowman et al. | 322/28 |
| 4,689,545 | 8/1987 | Komurasaki et al. | 322/28 X |
| 4,754,212 | 6/1988 | Mashino | 322/28 |
| 4,831,322 | 5/1989 | Mashino et al. | 322/28 |
| 4,839,576 | 6/1989 | Kaneyuki et al. | 322/25 |
| 5,061,889 | 10/1991 | Iwatani et al. | 322/28 |

FOREIGN PATENT DOCUMENTS

| | | |
|---|---|---|
| 0201243 | 4/1986 | European Pat. Off. |
| 0378075 | 1/1990 | European Pat. Off. |
| 0083600 | 5/1984 | Japan . |
| 0203834 | 9/1986 | Japan . |
| 0064299 | 3/1987 | Japan . |
| 0184300 | 7/1990 | Japan . |

Primary Examiner—Kristine L. Peckman
Attorney, Agent, or Firm—Antonelli, Terry, Stout & Kraus

[57] ABSTRACT

A charging generator for a vehicle including a field winding rotated by the rotation of an engine so as to generate a rotating magnetic field; an armature winding responsive to the rotating magnetic field to generate a current and charge a battery via a rectifier; a comparison circuit for comparing a voltage of the battery or a voltage of the rectifier with a predetermined value; a current control circuit for controlling a field current to be supplied to the field winding on the basis of output of the comparison circuit; a voltage change value detection circuit for detecting a change value in the battery voltage or the rectifier voltage; and a load response control circuit for suppressing a rise in the field current to be supplied to the field winding on the basis of an output of the voltage change value detection circuit.

32 Claims, 9 Drawing Sheets

CHARGING GENERATOR FOR A VEHICLE INCLUDING A CIRCUIT FOR SUPPRESSING A SUDDEN CHANGE IN A FIELD CURRENT

BACKGROUND OF THE INVENTION

The present invention relates to a charging generator for a vehicle which does not impose a sudden torque load upon an engine.

A generator is mounted on an automobile to provide power electric loads such as lamps and actuators. In general, this generator makes a field winding rotate by using a part of the torque generated by the engine, generates power by means of a rotating magnetic field generated by the field winding, and maintains the battery voltage at a predetermined value.

When the electric load becomes large, however, control is typically exercised so that the current flowing through the above described field winding suddenly becomes large, and hence an increased proportion of the torque generated by the engine is used for power generation. Therefore, the acceleration performance is degraded or the engine stalls, thereby exerting a bad influence upon the engine.

In order to suppress such a phenomenon, a so-called load response control has been devised, whereby when the electric load becomes large, a sudden increase of a current flowing through the above described field winding is suppressed to prevent an increased proportion of torque generated by the engine from being used for power generation.

In a known load response control as described in JP-A-62-64299, for example, the idle rotation state of an engine is regarded as an increase in proportion of torque used for power generation to the torque generated by the engine and then control is so exercised so as to suppress a sudden increase in current flowing through the field winding.

Further, in a known load response control as described in JP-A-59-83600, for example, lowering of a battery voltage below a predetermined value is regarded as an increase in proportion of torque used for power generation to the torque generated by the engine and then control is exercised so as to suppress a sudden increase in current flowing through the field winding.

Other prior art references are U.S. Pat. No. 4,263,543, U.S. Pat. No. 4,689,545, JP-A-61-203833, JP-A-61-203834 and JP-A-2-184300.

In the former one of the conventional techniques, however, control is always exercised so that the field current may rise only gradually when the engine advances to the idle rotation state. So long as the engine is in the idle rotation state, therefore, rise of the field current is suppressed even if the electric load is not large. Therefore, it becomes impossible to respond to voltage pulsation caused by pulsation of engine rotation and application of a small load. It is thus impossible to keep the battery voltage constant.

That is to say, the former one of the conventional techniques has a problem that when the engine advances to the idle rotation state, the battery voltage cannot be kept constant, resulting in blinking of or troubles in starting of various actuators, for example.

On the other hand, the latter one of the conventional techniques always exercises control so that the field current may rise only gradually when the battery voltage lowers below a predetermined value. In a case other than connection of a large electric load such as the case where the number of engine revolutions is lowered as in deceleration, for example, however, the generator output lowers, resulting in a phenomenon of sudden lowering of the battery voltage. In case the battery voltage lowers, it is necessary to raise the field current as quickly as possible to raise the generator output and thereby raise the battery voltage. Nevertheless, the field current is prevented from rising in this conventional technique. Therefore, the battery voltage cannot be kept at a predetermined value, resulting in a problem of trouble occurrence.

SUMMARY OF THE INVENTION

An object of the present invention is to provide a charging generator for a vehicle capable of exercising control so as to prevent the proportion of the torque used for power generation to the torque generated by the engine from being increased by accurately detecting connection of a large electric load and suppressing a sudden rise in field current.

In order to solve the above described problems a charging generator according to the present invention is configured so as to comprise a field winding rotated by the rotation of an engine so as to generate a rotating magnetic field, an armature winding responsive to the above described rotating magnetic field to generate a current and charge a battery via a rectifier, comparison means for comparing a voltage of the above described battery or a voltage of the above described rectifier with a predetermined value, current control means for controlling a field current to be supplied to 15 the above described field winding on the basis of an output of the above described comparison means, voltage change value detection means for detecting a change value in the above described battery voltage or the above described rectifier voltage, and a load response circuit for limiting a rise in field current to be supplied to the above described field winding on the basis of an output of the above described voltage change value detection means.

When a change value in battery voltage or a value according to the battery voltage exceeds a predetermined value in the above described configuration, the electric load is considered to have become large and control so as to suppress a sudden rise in field current is exercised.

It is thus possible to accurately determine that the electric load has become large. In other states, therefore, it becomes possible to control the field current quickly in response to changes in pulsation of engine rotation and load, and it becomes possible to keep the battery voltage constant.

BRIEF DESCRIPTION OF THE DRAWINGS

Other objects and advantages of the present invention will be apparent from the ensuing specification and attached drawings.

DESCRIPTION OF THE PREFERRED EMBODIMENTS

Figure 1:
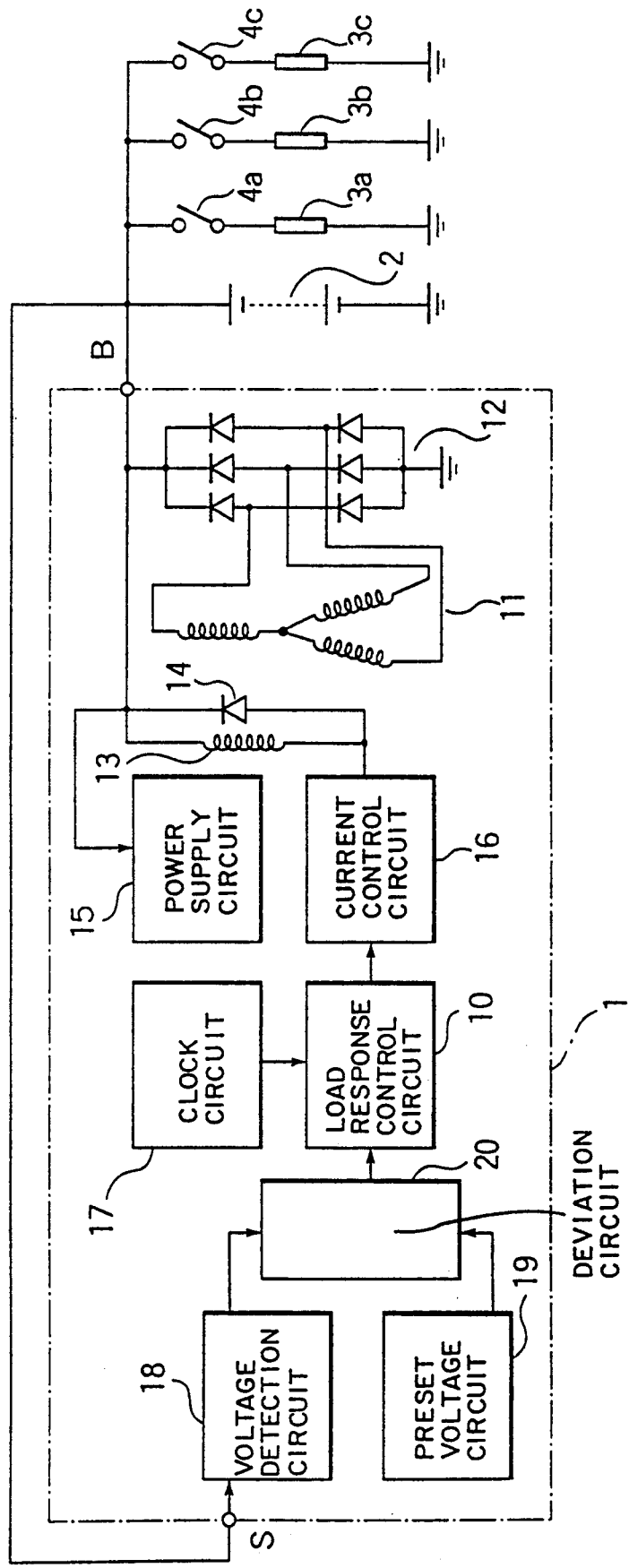
FIG. 1 is a block diagram showing the charging system of an automobile.

Embodiments of the present invention will hereinafter be described by referring to the drawings. FIG. 1 is a block diagram showing the charging system of an automobile. First of all, a charging generator 1 driven by an engine will now be described. A field winding 13 is coupled to the rotation axis of the engine via a belt and rotated in synchronism with the rotation of the engine to generate a rotating magnetic field. Further, in parallel to the field winding 13, a flywheel diode 14 for absorbing switching noise is connected.

An armature winding 11 is disposed in close vicinity to the field winding 13 and outputs a voltage having an AC waveform according to the magnitude of the rotating magnetic field produced by the field winding 13. The AC output of the armature winding 11 is efficiently rectified by a three-phase full-wave rectifier 12. The output of the three-phase full-wave rectifier 12 is supplied to a battery 2 via an output terminal "B" of the charging generator 1 to charge the battery 2. Further, at the same time, the output of the three-phase full-wave rectifier 12 is supplied from the above described output terminal "B" to electric loads 3a, 3b and 3c via switches 4a, 4b and 4c.

The battery 2 is connected to a power supply circuit 15. As described later, the power supply circuit 15 is provided to supply power with a fixed voltage to respective circuits of the charging generator 1. The power supply circuit 15 receives the output of the battery 2 and produces the fixed voltage. Further, the output of the battery 2 is connected to a voltage detection circuit 18. Together with output of a preset voltage circuit 19 for generating a reference voltage, the output of the above described voltage detection circuit 18 is inputted to a deviation circuit 20. The deviation circuit 20 calculates the deviation between the voltage of the battery 2 detected by the voltage detection circuit 18 and the reference voltage preset by the preset voltage circuit 19 and outputs the deviation thus calculated.

The output of the deviation circuit 20 is inputted to a load response control circuit 10, which will be described later in detail. In brief, the output Vx of the deviation circuit 20 as it is used as an output Vy of the load response control circuit 10 if an increase value in the output value of the deviation circuit 20 is below a predetermined value. Unless the increase value in the output value of the deviation circuit 20 is below a predetermined value, the load response control circuit 10 receives the output of a clock circuit 17 and operates so as to output a value which increases with a predetermined slope.

The output of the load response control circuit 10 is inputted to a current control circuit 16. On the basis of the output of the load response control circuit 10, the current control circuit 16 controls the current flowing through the field winding 13. That is to say, when the battery voltage detected by the voltage detection circuit 18 is larger than the reference voltage preset by the preset voltage circuit 19, the current control circuit 16 exercises control according to the deviation so that the field current flowing through the field winding 13 may become small. In response to this, the voltage generated by the armature winding 11 falls and the voltage applied to the battery 2 also falls. The field current is thus controlled according to the voltage of the battery 2. Therefore, the battery voltage is kept nearly equal to the reference voltage preset by the preset voltage circuit 19.

Alternatively, the terminal voltage of the electric load or the terminal voltage of the generator may be detected instead of the battery voltage to control the field current so that it may become a predetermined value.

Figure 2:
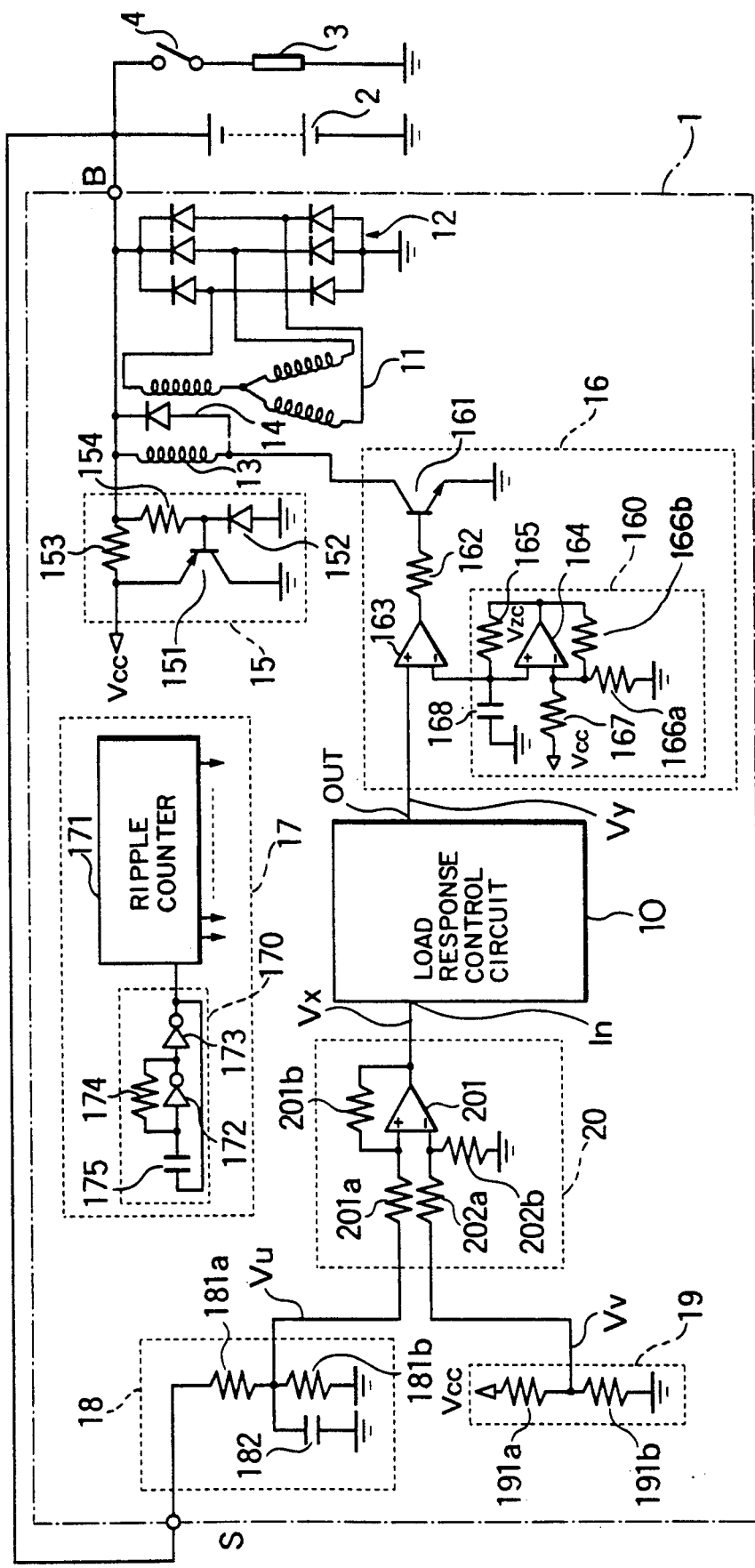
FIG. 2 is a diagram showing details of a circuit of a charging generator.

FIG. 2 is a diagram showing details of the circuits of the charging generator 1. The power supply circuit 15 comprises a PNP transistor 151, a Zener diode 152, and resistors 153 and 154. If the battery voltage becomes larger than the Zener voltage of the Zener diode 152, the transistor 151 is turned on in this circuit to obtain a voltage kept at a predetermined voltage. That is to say, assuming that the base-emitter voltage of the transistor 151 is $V_{BE}$ and the Zener voltage of the Zener diode 152 is $V_{Ze}$, fixed voltage $V_{cc}$ satisfying the following equation (1) can be derived.

$$V_{cc} = V_{BE} + V_{Ze} \tag{1}$$

The voltage detection circuit 18 comprises resistors 181a and 181b and a capacitor 182. The voltage detection circuit 18 divides the voltage of the battery 2 by using resistors 181a and 181b to detect the battery voltage and output a voltage $V_u$. Further, the voltage detection circuit 18 removes the ripple component of the voltage by using the capacitor 182.

The preset voltage circuit 19 comprises resistors 191a and 191b, and divides the output of the power supply circuit 15 by means of the resistors 191a and 191b to supply a reference voltage $V_v$ to the outside.

The deviation circuit 20 comprises resistors 201a, 201b, 202a and 202b as well as an operationl amplifier 201. The non-inverting input of the operational amplifier 201 is connected to the output voltage $V_u$ of the voltage detection circuit 18 via the resistor 201a and to the output of the operational amplifier 201 via the resistor 201b. The inverting input of the operational amplifier 201 is connected to the output voltage $V_v$ of the preset voltage circuit 19 via the resistor 202a and is grounded via the resistor 202b. Owing to such a configuration, the operational amplifier 201 provides an output voltage $V_x$ which is proportional to the voltage difference between the input voltages $V_u$ and $V_v$.

The clock circuit 17 comprises a ripple counter 171, NOT gates 172 and 173, a resistor 174, and a capacitor 175. First of all, the NOT gates 172 and 173, the resistor 174 and the capacitor 175 form a well-known oscillation circuit 170. The ripple counter 171 performs frequency division upon the clock signal generated by the oscillation circuit 170 to generate a plurality of clock signals having different periods.

The current control circuit 16 comprises a power transistor 161, a resistor 162, comparator 163, resistors 165, 166a, 166b and 167, and a capacitor 168. An operational amplifier 164, the resistors 165, 166a, 166b and 167, and the capacitor 168 form a well-known triangular wave generation circuit 160 and output a voltage $V_{zc}$ which changes by predetermined periods. Further, the comparator 163 compares the outputs voltage $V_{zc}$ of the triangular wave generation circuit 160 with $V_y$ of the load response control circuit to output a pulse train with a predetermined period. In response to this pulse train outputted by the comparator 163, the power transistor 161 is turned on and off to control the field current flowing in the field winding 13.

Details of the load response circuit 10 will now be described by referring to FIG. 3. The output voltage $V_x$ of the deviation circuit 20 is applied to an input IN of the circuit 10. The load response circuit 10 comprises a gradual increase circuit 101, a temporal differential detector 102, comparators 103 and 104, a set-reset flip-flop 105 and a reference voltage source 106. If the input at terminal G is "0", the gradual increase circuit 101 outputs the input voltage as it is. If the input at terminal G is "1", the gradual increase circuit 101 outputs a voltage increasing from the input voltage, which is obtained when the input at the terminal G has changed from "0" to "1", with a predetermined slope. Further, the temporal differential detector 102 outputs a voltage having a value corresponding to the increase of the input voltage per unit time.

The output of the deviation circuit 20 is coupled to the input of the gradual increase circuit 101, a negative side input of the comparator 103, and the input of the temporal differential detector 102. The output of the gradual increase circuit 101 is coupled to a positive side input of the comparator 103 and is provided as an output "OUT". Further, the output of the temporal differential detector 102 is coupled to a positive side input of the comparator 104, whereas a negative side input of the comparator 104 is coupled to the reference voltage source 106. Further, the output of the comparator 103 is coupled to an input R of the flip-flop 105, whereas the output of the comparator 104 is coupled to an input S of the flip-flop 105. Further, an output Q of the flip-flop 105 is coupled to the G terminal input of the gradual increase circuit.

Operation of the load response control circuit 10 based upon such a configuration will now be described. The output voltage $V_x$ of the deviation circuit 20 is differentiated by the temporal differential detector 102 to produce an output voltage $V_w$. This output voltage $V_w$ of the temporal differential detector 102 is compared with the voltage of the reference voltage source 106 by the comparator 104. If the output of the comparator 104 is "0", i.e., the increase value of the output voltage of the deviation circuit 20 does not exceed a predetermined value and the output voltage $V_w$ of the temporal differential detector 102 is smaller than the voltage of the reference voltage source 106, then the S input of the flip-flop 105 remains at "0" and the output of the flip-flop 105 does not change. (In the typical state, the output of the flip-flop 105 is kept at "0".) Therefore, the G terminal input of the gradual increase circuit 101 is "0", and the output "OUT" becomes equivalent to the input IN (which is equivalent to the output voltage $V_x$ of the deviation circuit 20).

If an increase value of the output voltage $V_x$ of the deviation circuit 20 is not below a predetermined value, the output of the comparator 104 becomes "1" and the output of the flip-flop 105 becomes "1". As a result, the G terminal input of the gradual increase circuit 101 becomes "1", and the output voltage $V_y$ of the load response control circuit 10 is switched from the output voltage $V_y$ of the deviation circuit 20 to the a voltage produced in the gradual increase circuit 101 so as to increase with a constant slope. This state lasts until the output voltage of the gradual increase circuit 101 becomes larger than the output voltage of the deviation circuit 20 to change the output of the comparator 103 to "1" and this signal is inputted to the R input of the flip-flop 105.

If "1" is inputted to the R input of the flip-flop 105 and the output of the flip-flop 105 becomes "0", then the G terminal input of the general increase circuit 101 becomes "0" and the output voltage $V_y$ of the deviation circuit 20 as it is again becomes the output voltage $V_y$ of the load response control circuit.

Figure 4:
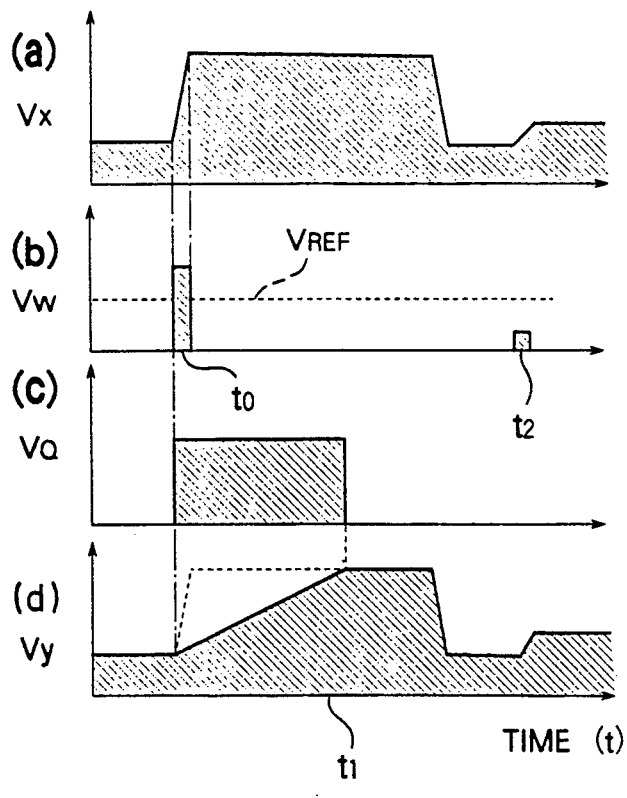
FIG. 4 is a time chart showing the change of output voltage of respective component circuits.

This operation will now be described briefly again by referring to time charts shown in FIG. 4. FIG. 4(b) shows the waveform of the temporal differential detector 102 which outputs the temporal differential of the waveform of FIG. 4(a). If the differential value $V_w$ exceeds the voltage $V_{REF}$ of the reference voltage source 106 at time $t_0$, the output of the comparator 104 becomes "1" to set the flip-flop 105, $V_Q$ becoming "1". This is represented by the waveform of FIG. 4(c). As shown in FIG. 4(d), therefore, the output of the gradual increase circuit 101 gradually increases. If $V_y$ reaches the value of $V_y$ at time $t_1$, the output of the comparator 103 becomes "1" to reset the flip-flop 105.

In this embodiment, the output of the gradual increase circuit 101 is switched from the output voltage of the deviation circuit 20 to the gradually increasing voltage on the basis of the increase value of the output voltage of the deviation circuit 20 per unit time. Alternatively, however, the output of the gradual increase circuit 101 may be switched from the output of the deviation circuit 20 to the gradually increasing voltage on the basis of the increase value of the field current flowing through the field winding 13 per unit time.

Further, the load response control circuit 10 may be actuated according to the number of revolutions of the engine or generator. For example this alternative form can be adopted by providing an AND gate, supplying a signal representing the number of revolutions which becomes "1" when the engine speed does not exceed a predetermined number of revolutions (idle revolution speed) to one input of the AND gate, supplying the output of the flip-flop 105 shown in FIG. 3 to the other input of the AND gate, and supplying the output of the AND gate to the G terminal input of the gradual increase circuit.

Further, it is also possible to adopt the voltage of the battery 2 as a parameter of the load response control circuit 10 and to provide a circuit for canceling or limiting the gradual increase to avoid trouble with other devices in case such a voltage drop of the battery 2 as to affect other electric loads of the automobile is detected when the output of the generator 1 is gradually increased. The circuit can be formed, in the same way as the way of inputting the revolution speed parameter to the G terminal of the gradual increase circuit (101 of FIG. 3), by using an AND gate, supplying an output of a circuit such as to yield "0" when the battery voltage lowers to one input of the AND gate, and supplying the G terminal input to the other input of the AND gate.

Figure 5:
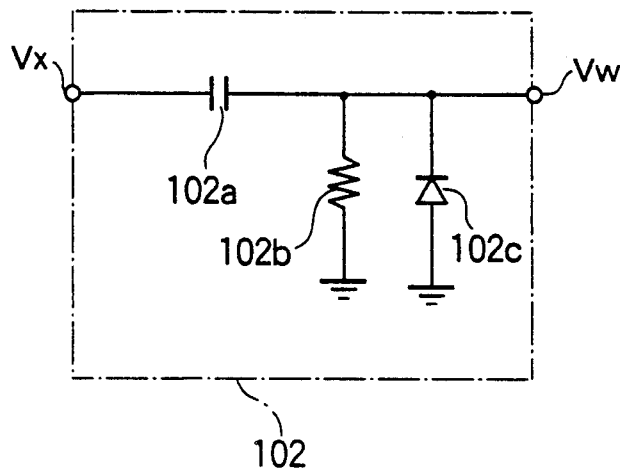
FIG. 5 is a diagram showing details of a temporal differential detector.

Details of internal circuits of the temporal differential detector 102 and the gradual increase circuit 101 shown in FIG. 3 will now be described by referring to FIGS. 5 and 6. With reference to FIG. 5, the temporal differential detector circuit comprises a capacitor 102a, a resistor 102b and a diode 102c. Further, the capacitor 102a and the resistor 102b form a high-pass filter and detect the temporal change of the input signal Vx. As for the temporal change thus detected, the temporal change in the negative direction is removed by the diode 102c, and the temporal change in the positive direction, i.e., the positive temporal differential value of the input signal Vx is outputted as the output signal Vy.

Figure 6:
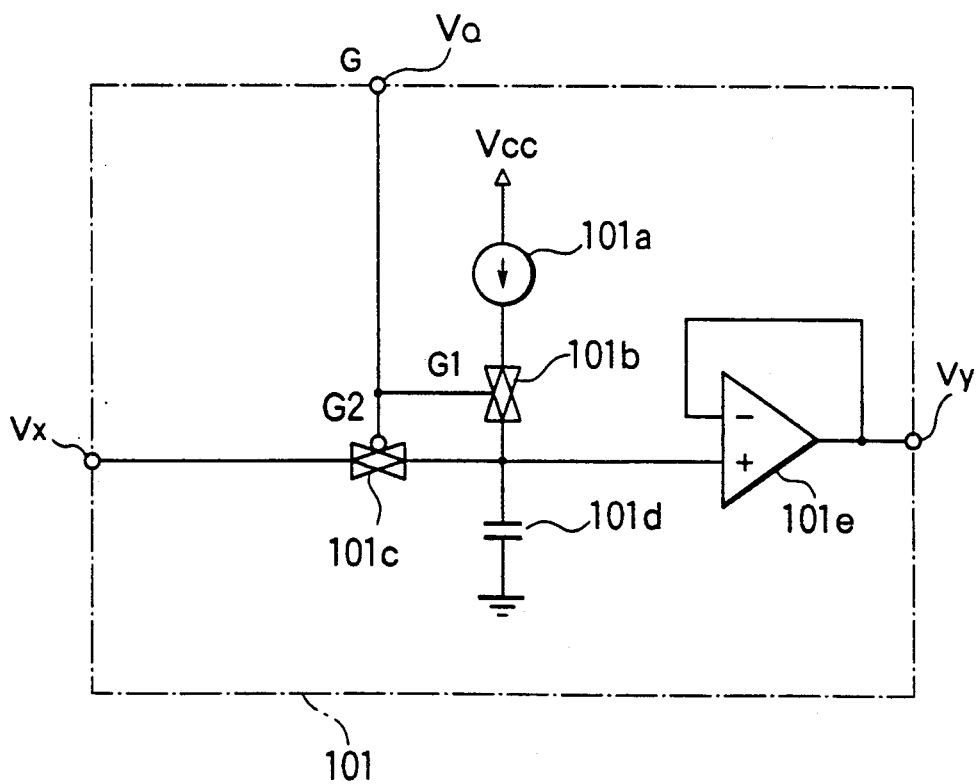
FIG. 6 is a diagram showing details of a gradual increase circuit.

With reference to FIG. 6, the internal circuit of the gradual increase circuit 101 comprises a constant current source 101a, analog switches 101b and 101c, a capacitor 101d and an operational amplifier 101e. Analog switches 101b and 101c comprise MOS transistors, for example, and are adapted to close respectively if G1="1" and G2="0" and open otherwise.

Operation of the gradual increase circuit 101 having such a configuration will now be described briefly. When the input signal $V_Q$ at the terminal G is "0" (i.e., when the output of the flip-flop 105 shown in FIG. 3 is "0"), the analog switch 101c is closed and the analog switch 101b is opened, and hence the input signal Vx becomes the output signal Vy as it is. The operational amplifier 101e functions as a voltage follower and is provided to output the terminal voltage of the capacitor 101d to the output terminal Vy without being affected by an external circuit connected to the output terminal Vy.

Figure 3:
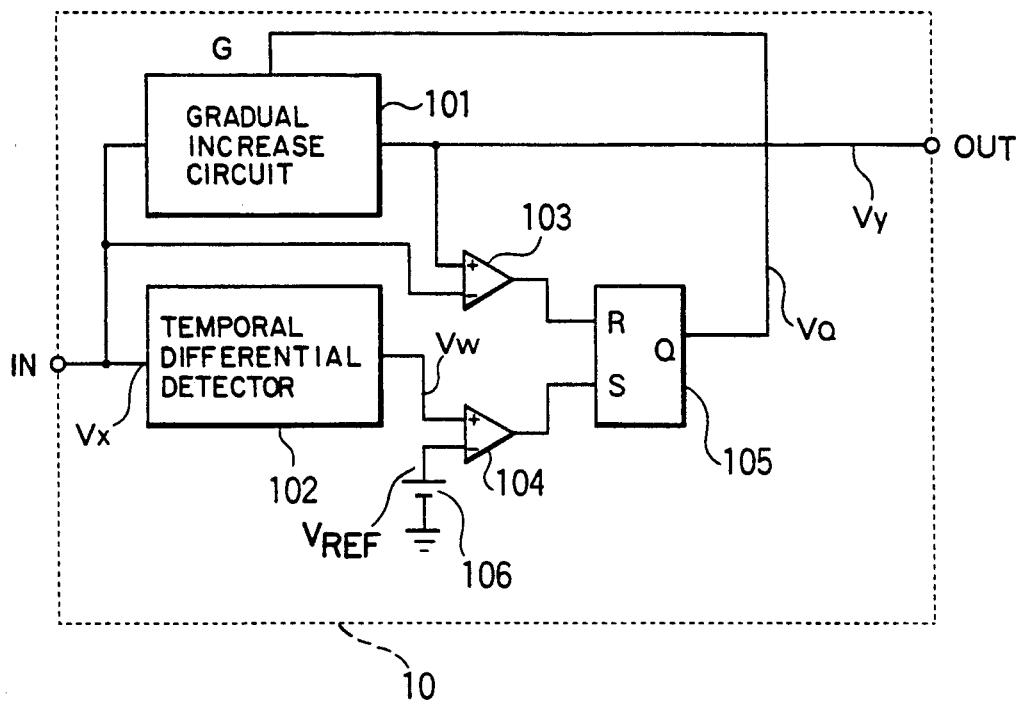
FIG. 3 is a diagram showing details of a load response control circuit.

On the other hand, when the input signal $V_Q$ at the terminal G is 1 (i.e., when the output of the flip-flop 105 shown in FIG. 3 is "1"), the analog switch 101b is closed and the analog switch 101c is opened. In response to this, the voltage of the capacitor 101d gradually increases from the initial value, which is the value immediately before a change of $V_Q$, as a result of addition of voltage thereto at a rate determined by the current value of the constant current source 101a and the capacitance value of the capacitor 101d.

Here, such a configuration as to make always constant the change rate at the time when the output of the generator 1 gradually increases is adopted. If the current value of the current source 101a shown in FIG. 6 is made variable according to the input Vx of the load response control circuit 10, the output Vw of the temporal differential detector 102, the number of revolutions of the engine, or the voltage of the battery 2, however, it is possible to further improve the lowering in voltage control performance of the generator 1 and make a disturbance with respect to the engine small.

Figure 7:
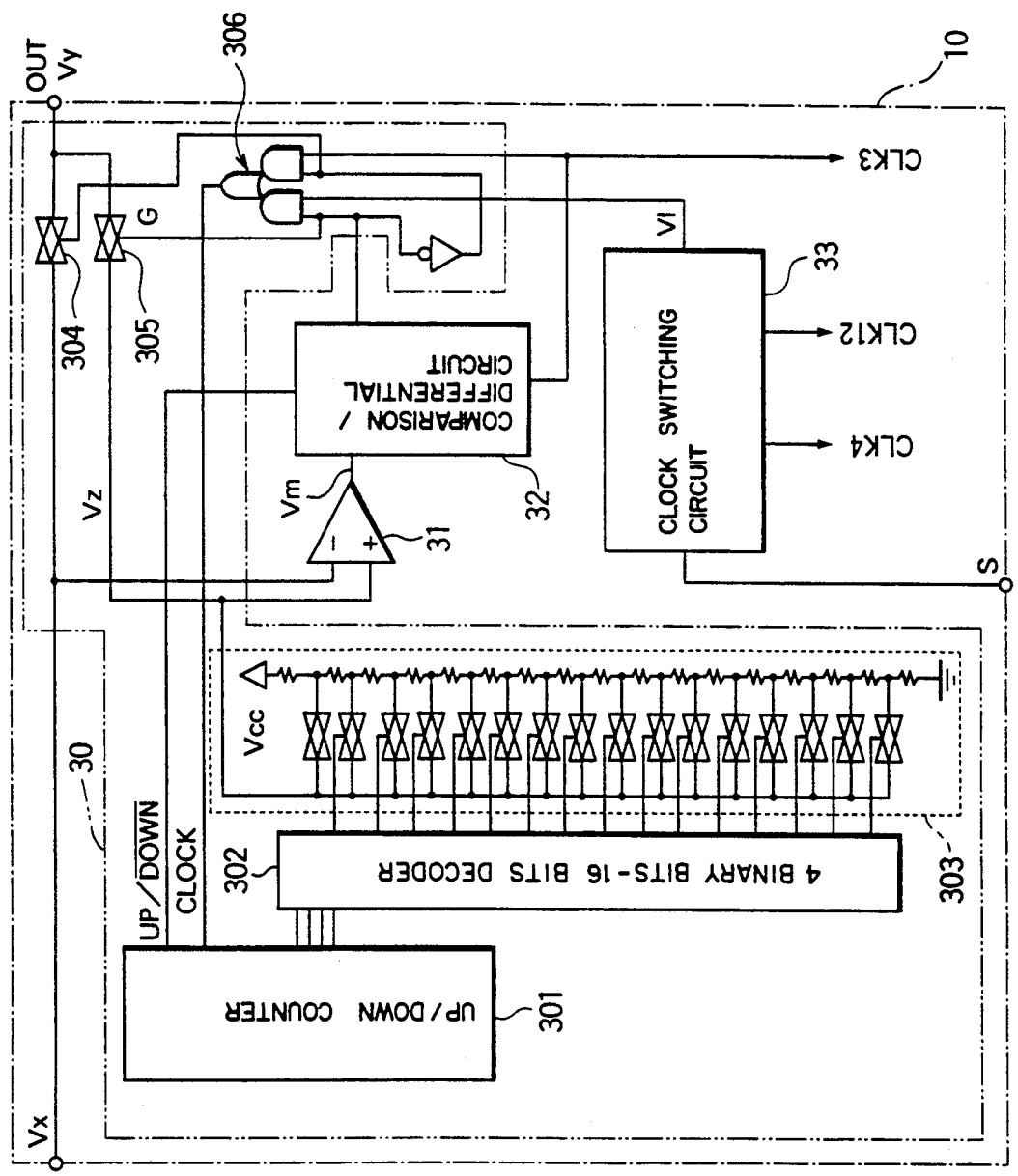
FIG. 7 is a diagram showing a second embodiment of the load response control circuit.

Another embodiment of the load response control circuit 10 will now be described by referring to FIG. 7. In this embodiment, many digital circuits are used. Further, the load response control circuit 10 has all functions of the load response control circuit shown in FIG. 3, and also has function of gradually changing the output with respect to the negative-direction component of the temporal differential value of the input signal Vx.

Analog switches 304 and 305 select one out of the output voltage Vx of the deviation circuit 20 and the output voltage Vz of a gradual increase/decrease circuit 30 as the output voltage Vy of the load response control circuit 10. That is to say, when the analog switch 304 is on, the analog switch 305 turns off and the output voltage Vx of the deviation circuit 20 is provided as the output voltage Vy of the load response control circuit 10. On the other hand, when the analog switch 304 is in the off-state, the analog switch 305 turns on and the output voltage Vz of the gradual increase/decrease circuit 30 is provided as the output voltage Vy of the load response control circuit 10.

The gradual increase/decrease circuit 30 comprises, in addition to the above described analog switches 304 and 305, an up/down counter 301, a decoder 302 for converting four binary bits into 16 lines, a D-A conversion circuit 303 and logic gates 306.

This gradual increase/decrease circuit 30 is configured so that its output voltage Vz may become equal to the output voltage Vx of the deviation circuit 20 when the change of the output voltage Vx of the deviation circuit 20 is small and so that the output voltage may gradually increase/decrease when the change of the output voltage Vx of the deviation circuit 20 is large.

The gradual increase/decrease circuit will now be described in more detail. On the basis of an UP/DOWN signal outputted from a comparison and differential circuit 32, the count in the up/down counter 301 increases or decreases whenever a CLOCK pulse is applied. That is to say, the count in the up/down counter increases if the UP/DOWN signal is "1". If the UP/DOWN signal is "0", the count in the up/down counter decreases. The count in the up/down counter 301 is inputted to the decoder 302. Further, the D-A conversion circuit 303 performs digital-analog conversion on the output of the decoder 302 to generate the output voltage Vz.

The comparison and differential circuit 32 has two functions. By the first function, the UP/DOWN signal is set at "0" or "1" on the basis of a difference between the output voltage Vz of the gradual increase/decrease circuit 30 and the output voltage Vx of the deviation circuit 20. By the second function, the differential output voltage G is changed from "0" to "1" when the change value of the output voltage Vx of the deviation circuit 20 per predetermined time is large. Typically, this differential output voltage G is kept at "0". If the differential output voltage of the comparison and differential circuit 32 is in the state of "1", the analog switch 304 turns off and the analog switch 305 turns on. Therefore, the output voltage Vy of the load response control circuit 10 is switched to the output voltage Vz of the gradual increase/decrease circuit 30. In the same way, this circuit is so configured that the CLOCK inputted to the up/down counter 301 may be switched to clocks CLK3 through CLK12 via the logic circuit 306. Increase/decrease of the count in the up/down counter thus becomes gradual.

CLK3 and CLK12 are clock signals having periods of 8 msec and 4.096 sec, respectively.

According to the battery voltage, a clock switching circuit 33 switches the CLOCK of the up/down counter 301. That is to say, if the battery voltage rises above a predetermined value, the period of the CLOCK is made shorter to make the battery voltage rise quickly.

Figure 8:
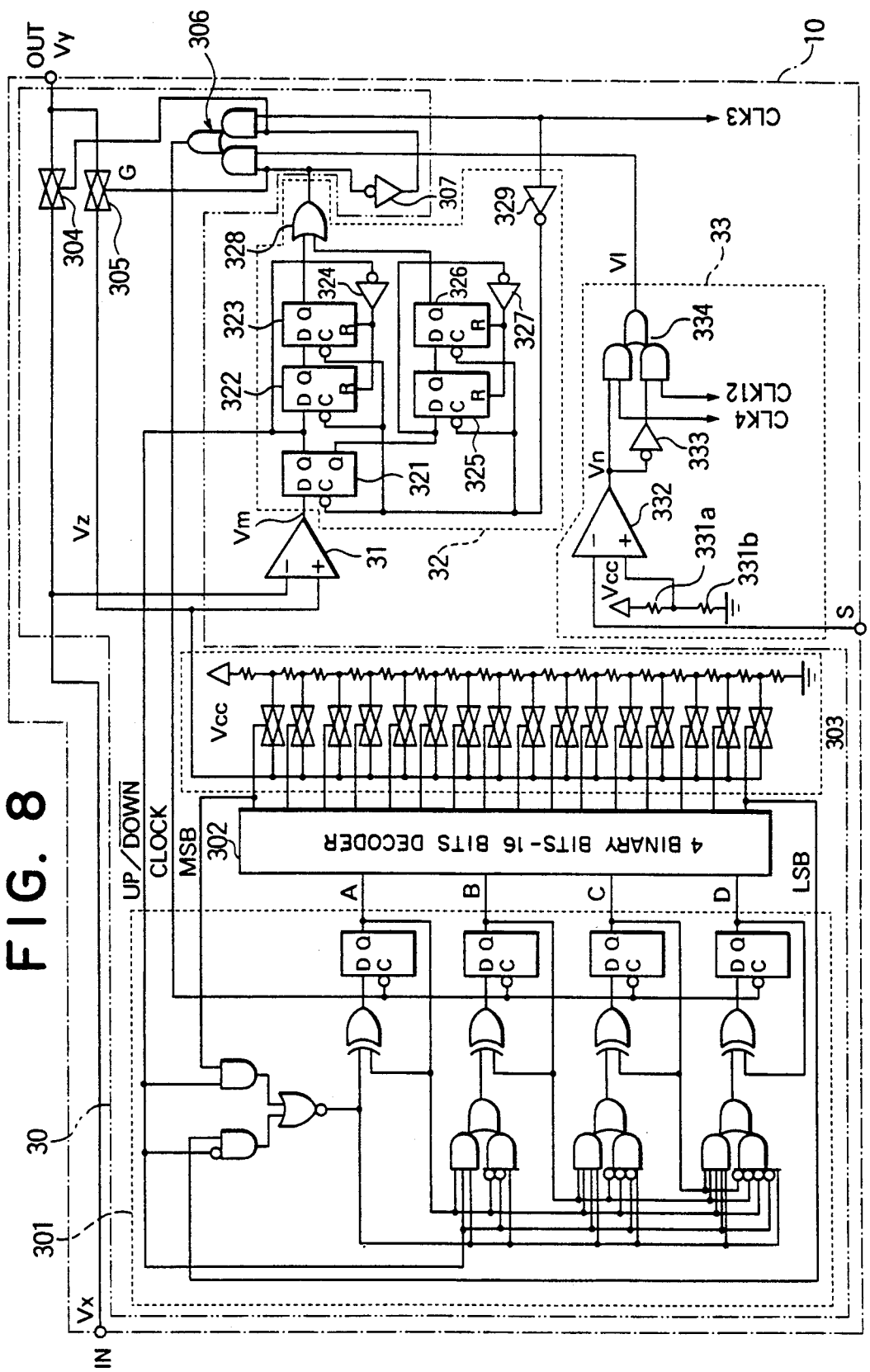
FIG. 8 is a diagram showing details of the second embodiment of the load response control circuit.

Details of elements of the load response control circuit 10 will now be described by referring to FIG. 8. First of all, the counter 301 comprises universally known logic gates including flip-flops, AND-OR composite gates, NOR gates, AND gates and EXOR gates.

Further, operation of this gradual increase/decrease circuit 30 will now be described. Description will be given for the case where G="1" and the case where G="0" separately.

(1) G=1 It is now assumed that the change of the output Vx of the deviation circuit 20 is small and the differential output G of the comparison and differential circuit 32 is "1".

(a) When the UP/DOWN input signal is "1", the CLOCK becomes $V_l$ and the count in the up/down counter 301 is increased with the period of the clock signal $V_l$. Output values A, B, C and D of the up/down counter 301 are thus increased. (A corresponds to the highest order whereas D corresponds to the lowest order.) In response to this, binary signals on 16 lines move in the direction oriented from the LSB to the MSB. Therefore, the analog signal Vz increases in synchronism with the generation period of the CLOCK signal $V_l$. In case of the analog signal Vz, the increase is determined by voltage division ratios of 17 resistors connected in series. If all of 17 resistors have identical values, the increment of Vz is always constant. As for the analog switches 304 and 305, the analog switch 304 turns off and the analog switch 305 turn on. Therefore, the output voltage Vy of the load response control circuit 10 becomes equal to the output voltage Vz of the gradual increase/decrease circuit 30. A signal increasing stepwise at periods generated by the CLOCK signal (herein $V_l$) is outputted to Vy.

(b) When the UP/DOWN input signal is "0", the CLOCK signal becomes a signal similar to that of the case (a). Therefore, the count in the up/down counter 301 is decreased at the periods generated by clocks of the CLOCK signal $V_l$. The output signal of the decoder 302 moves in the direction oriented from the MSB to the LSB. The analog signal Vz decreases at periods similar to those of (a) and with changes similar to those of (a). As for the analog switches 304 and 305, the analog switch 304 is off and the analog switch 305 is on in the same way as (a). Therefore, the output voltage Vy becomes equal to the output voltage Vz. The load response control Vy decreases stepwise at periods generated by the CLOCK signal (herein $V_l$).

(2) G=0 It is supposed that the change of the output Vx of the deviation circuit 20 is large and the differential output of the comparison and differential circuit G is 0.

(a) When the UP/DOWN input signal is "1", the CLOCK signal becomes the clock signal CLK3, and hence the count in the up/down counter 301 increases at periods generated by the clock signal CLK3. However, the analog switch 304 turns on and the analog switch 305 turns off. Therefore, the output voltage Vy becomes equal to the output voltage Vx. The input voltage Vx as it is thus becomes the output voltage Vy.

(b) When the UP/DOWN input signal is "0", the output voltage Vy becomes equal to the output voltage Vx in the same way as (2)-(a). In contrast with (2)-(a) described before, however, the count in the up/down counter 301 decreases. That is to say, when the G terminal signal has become "0", the input signal is outputted as it is as the output voltage Vy irrespective of the count in the up/down counter 301. Within the load response control circuit 10, a change of the output of the up/down counter 301 switches the negative side input (i.e., input which becomes the reference of comparison) of a comparator which will be described later.

When MSB of the output value of the 16-bit decoder 302 is "1", the count in the up/down counter 301 limits the increase. When the LSB is "1", the up/down counter 301 functions so that the count may not decrease. When the output voltage Vx of the deviation circuit gets out of the range between the maximum value of the D-A conversion circuit and the minimum value thereof, the outputs A, B, C and D of the up/down counter 301 do not change and the output voltage Vz is kept at the above described maximum value or minimum value.

The comparison and differential circuit 32 will now be described. The comparison and diferential circuit comprises flip-flops 321, 322, 323, 325 and 326 as well as inverter gates 324 and 327. The comparison and differential circuit is a circuit having all functions of the temporal differential detector 102, comparator 104, flip-flop 105, and reference voltage source 106 shown in FIG. 3.

On the basis of a signal obtained by inverting the clock signal CLK3 in an inverter 329, the D flip-flop 321 changes values at its Q output terminal and $\bar{Q}$ output terminal and outputs Q and $\bar{Q}$ at the falling edge of the output of the inverter 329. The output Q of the flip-flop 321 becomes the UP/DOWN signal of the up/down counter 301. If the UP/DOWN signal is "1", the up/down counter 301 increases its count. If the UP/DOWN signal is "0" on the contrary, the up/down counter 301 decreases its count.

In case the voltage Vz obtained by applying D-A conversion to the output of the up/down counter 301 is larger than the output voltage Vx of the deviation circuit and the comparator 31 thus outputs "1" as Vm, establishment of relation $\bar{Q}$="0" causes the output of the inverter 327 to become "1". Therefore, "1" is applied to reset R of the flip-flops 325 and 326. Outputs Q of the flip-flops 325 and 326 become "0" and are not affected by a change in clock signal outputted by the inverter 329. Since "1" is supplied to the input terminal of the flip-flop 322, Q output terminal of the flip-flop 322 changes to "1" at the timing of generation of an output signal by the inverter 329 in a period succeeding that of timing of output change of the flip-flop 321 (i.e., in a period of the clock signal CLK3). At a timing delayed from the flip-flop 322 by one more period, the Q terminal output of the flip-flop 323 changes to "1". When the output of the flip-flop 323 has become "1", the output voltage G of an OR gate 328 becomes "1".

In case the voltage Vz obtained by applying D-A conversion to the output of the up/down counter 301 is larger than the output voltage Vx of the deviation circuit and the comparator 31 thus outputs "0", the Q terminal output of the flip-flop 321 becomes "0" when the clock is inputted after Vm="1" has been caused. Thus the $\bar{Q}$ terminal output changes to "1". When the Q terminal output becomes "0", the output of the inverter 324 becomes "1" and hence inputs of reset terminals R of the flip-flops 322 and 323 immediately become "1". The Q terminal outputs of the flip-flops 322 and 323 thus become "0". At this time, the UP/DOWN signal of the up/down counter 301 (i.e., the Q output terminal of the flip-flop 321) becomes "0". Switching from the direction of count increase to the direction of count decrease is made. Since Q terminal outputs of both the flip-flops 323 and 326 are "0", the output G of the OR gate 328 becomes "0". The output Q of the flip-flop 325 becomes "1" when the next clock occurs after the output of the flip-flop 321 has changed. The Q terminal output of the flip-flop 326 changes to "1" when the next clock occurs after the output of the flip-flop 325 has changed to "1". At this time, the output voltage G of the OR gate 328 becomes "1" again.

As heretofore described, the comparison and differential circuit 32 conducts the following two operations. (1) When the output voltage Vm of the comparator 31 is "1", i.e., when the input voltage Vx is higher than the output voltage Vz of the gradual increase/decrease circuit 30, the comparison and differential circuit causes the UP/DOWN signal to be "1" to increase the output voltage Vz of the gradual increase/decrease circuit 30. When, on the contrary, the output voltage Vx is lower than the output voltage Vz, the comparison and differential circuit causes the UP/DOWN signal to be "0" to decrease the output voltage Vz. And the comparison and differential circuit controls the output voltage Vz so that the output voltage Vz may coincide with the output voltage Vx.

Further, the comparison and differential circuit 32 conducts operation equivalent to the functions of the temporal differential detector 102, comparator 104, reference voltage source 106 and flip-flop 105 shown in FIG. 3.

Assuming now that the output voltage Vm changes from "0" to "1", Q terminal outputs of the flip-flop 321, flip-flop 322 and flip-flop 323 are successively changed from "0" to "1" at timing generated by CLK3 (i.e. the output of the inverter 329). That is to say, when time for CLOCK generation corresponding to three pulses (time corresponding to two pulse at minimum) has elapsed since the output voltage Vm changed from "0" to "1", the output Q of the flip-flop 323 becomes "1". Therefore, the output voltage G of the OR gate 328 changes from "0" to "1" when two to three pulses occur at periods of the clock signal CLK3 after the output voltage Vm changes from "0" to "1". That is to say, if the relation that output voltage Vx>output voltage Vz lasts for two to three clock periods of the clock signal CLK3, G changes from "0" to "1".

The reference signal Vz of the comparator 31 has its voltage increased or decreased in synchronism with the clock signal CLK3. When Vm="1", Vz increases by an amount corresponding to two to three bits of the D-A conversion circuit 303 during two to three clock periods of the clock signal CLK3. Assuming now that the output voltage Vm changes from "0" to "1" and ΔVx is a change in output voltage Vx, therefore, the differential output G of the comparison and differential circuit 32 becomes "1" when the following expression (2) is satisfied.

$$\frac{\Delta Vx}{2 \text{ to } 3 \text{ periods of } \overline{CLK3}} > \text{(change of 2 to 3 bits of the digital-analog converter)} \quad (2)$$

That is to say, when the temporal differential value of the output voltage Vx has exceeded a predetermined value, the above described expression (2) is satisfied and the input voltage G of the gradual increase/decrease circuit 30 becomes "1". If the output voltage Vz of the load response control circuit 30 gradually changes and the output voltage Vx coincides with the output voltage Vz or exceeds the output voltage Vz, the output voltage Vm becomes "0". When the next clock signal of the flip-flop 321 is generated, therefore, G becomes "0". The inverter 329 inverts the output of the clock signal CLK3 to produce a clock signal to be inputted to the flip-flops 321, 322, 323, 325 and 326. This inverter is provided to keep flip-flop data being set when the output voltage Vz changes at timing of change of the up-/down counter 301 and the output voltage Vm of the comparator 31 becomes unstable.

A clock switching circuit 33 and an input terminal S shown in FIG. 8 will now be described. A block having the same function as the clock switching circuit 33 and the input terminal S is not illustrated in FIG. 3. The terminal S is connected to the terminal S shown in FIG. 2 and is provided with the voltage of the battery 2. The clock switching circuit 33 divides the voltage of the power supply $V_{cc}$ to create a reference voltage. The clock switching circuit 33 comprises resistors 331a and 331b, a comparator 332 for comparing the reference voltage with the S terminal voltage, outputting "1" if the S terminal voltage is higher than a predetermined voltage, and outputting "0" otherwise, and a logic gate circuit. In the logic gate circuit, an inverter 333 and an AND-OR composite gate 334 form a data selector. When the output voltage Vn of the comparator 332 is "1", the clock signal CLK4 is outputted from the composite gate 334 as output signal $V_l$. When Vn is "0", the clock signal CLK12 is outputted from the composite gate 334 as the output signal $V_l$.

When the voltage of the battery 2 exceeds the voltage determined by the ratio of resistors 331a and 331b, the clock signal CLK4 is defined as the clock signal $V_l$ for determining the rate of gradual increase/decrease in the gradual increase/decrease circuit 30. Otherwise, the clock signal CLK12 is defined as the clock signal $V_l$. Each of the clock signal CLK4 and the clock signal CLK12 is a clock signal similar to the clock signal CLK3. They have periods of 16 msec and 4.096 sec, respectively. By providing a clock switching circuit 33 in the load response control circuit 10, it becomes possible to prevent an abnormal rise of battery voltage caused by gradually decreasing the output voltage Vy when the output voltage Vx has decreased.

Figure 9:
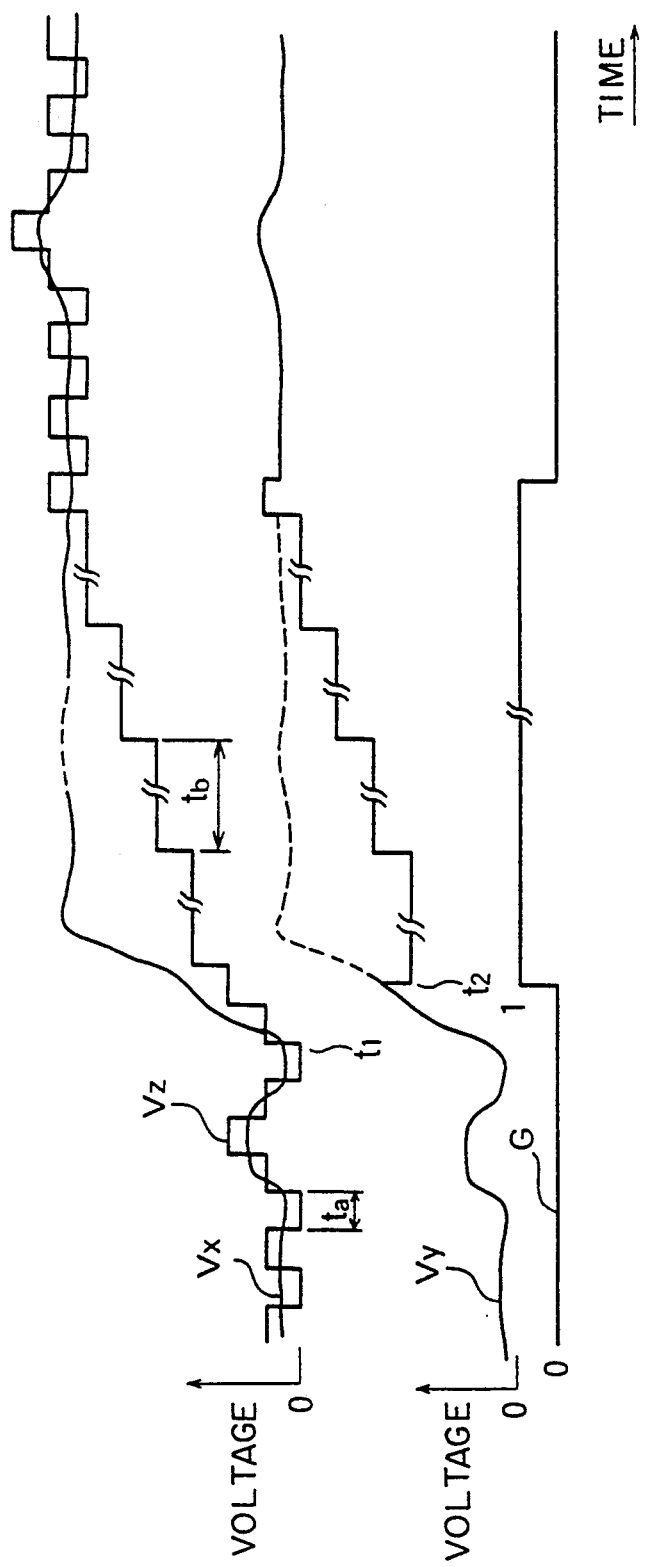
FIGS. 9 and 10 are time charts of the output of the second embodiment of the load response control circuit.

FIG. 9 is a time chart showing the temporal change of the input voltage Vx, the output voltage Vy, the output voltage Vz of the D-A conversion circuit 303, and G of the gradual increase/decrease circuit 33 obtained when the input signal Vx is increased by connection of the electric load 3, where $t_a$ is the period 8 msec of the clock signal CLK3 and $t_b$ is the period 4096 msec of the clock signal CLK12. At time $t_1$, the electric load is coupled. At time $t_2$, the signal G is changed from "0" to "1". In FIG. 9, a delay is caused between the time $t_1$ whereat the load is coupled and the time $t_2$ whereat the output voltage Vy gradually increases. This delay is caused, for example, by a delay time for detecting the temporal differential value of the input signal voltage Vx. An overshoot appears in the output voltage Vy just for a little while. If it is made sufficiently small as compared with the delay caused by the inductive component of the current flowing through the field winding 13, however, it does not appear in the generator output as a large change.

Figure 10:
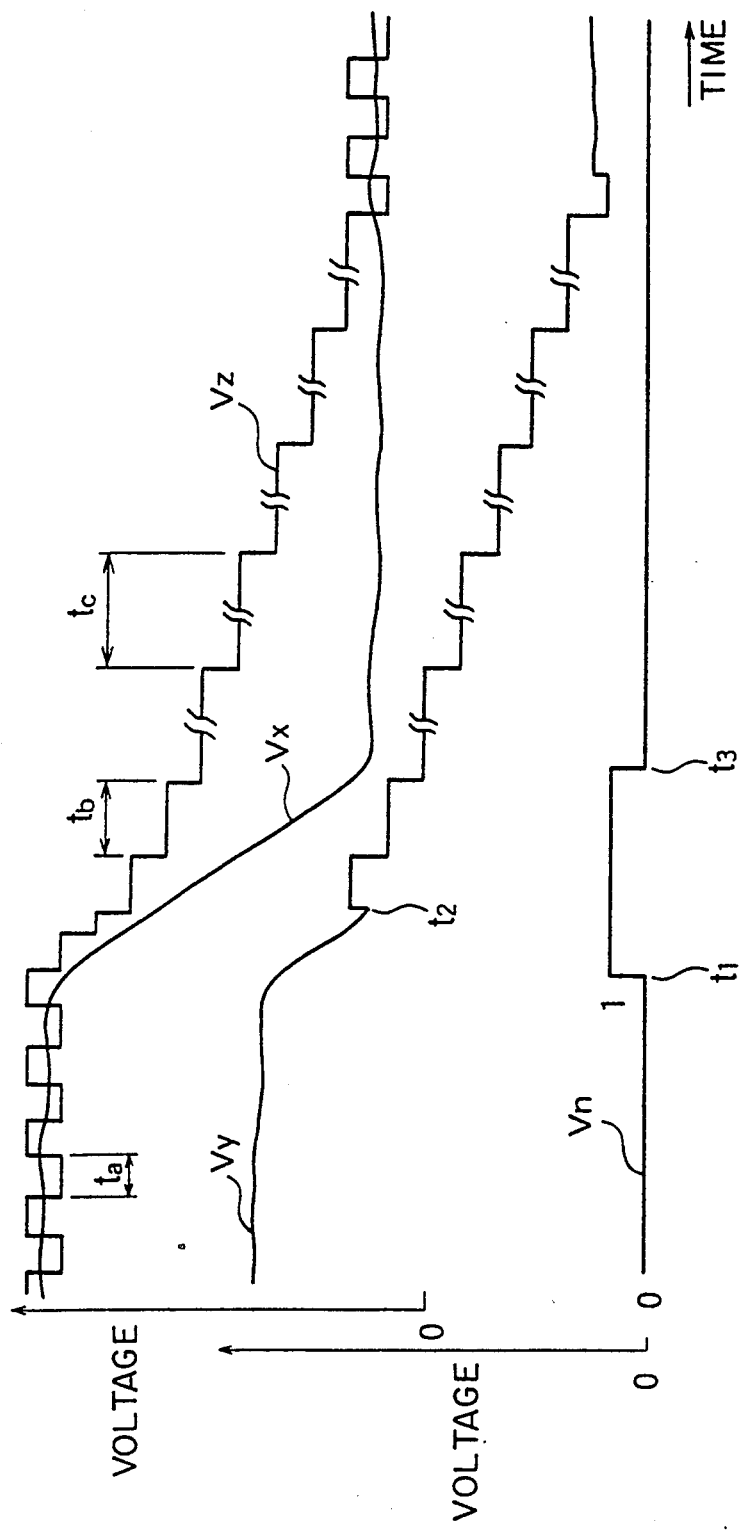

FIG. 10 shows waveforms representing the temporal change of the input voltage Vx, the output voltage Vz of the D-A conversion circuit 303, the output voltage Vy of the load response control circuit 10 and the output voltage Vn of the comparator 332 obtained when the input voltage Vx is decreased by interruption of the electric load 3, for example, where $t_a$, $t_b$ and $t_c$ denote time widths of 8, 16 and 4096 msec, respectively. At time, the electric load 3 is interrupted. At time $t_2$, the output voltage Vy begins to gradually decrease. On the other hand, the output voltage Vn is "1" from the time $t_1$ to $t_3$. That is to say, it is shown that the voltage of the battery 2 is raised (because of output voltage rise of the generator 1, for example) by interruption of the electric load 3 and exceeds a predetermined value. Until the time t₃, therefore, the rate of gradual decrease becomes a value defined by the clock signal CLK4 (period $t_b$) When the voltage of the battery 2 becomes below a predetermined value at the time t₃, the rate of gradual decrease is defined as a value determined by the clock signal CLK12 (period $t_c$) At t₂, an undershoot occurs in the output Vy. In the same way as the description of FIG. 9, it is possible to make the change of field current small by means of a delay in the inductive component of the current flowing through the field winding 13. Little influence is exerted upon the drive torque of the generator 1. Further, this undershoot can be decreased by adjusting constants of the gradual increase/decrease circuit 30, clock period, or the like so that a change in field current may coincide with a change in output voltage Vz. Since the clock period has a degree of freedom, this embodiment is advantageous in circuit integration as compared with a circuit using a capacitor or the like. In particular, this embodiment is effective for use in circuits such as monolithic IC's.

Further, in the present embodiment, a temporal change value is detected by multistage connection of flip-flops. Since the present configuration has a delay in detection of simultaneous change value, however, false operation caused by noises or the like is prevented.

The voltage of the battery 2 is adopted as a parameter only when it has exceeded the predetermined voltage. However, it is also possible to adopt the voltage of the battery 2 even when it is below the predetermined voltage and change the rate of gradual increase/decrease in the same way as the case where the voltage of the battery 2 exceeds the predetermined voltage or cancel the gradual increase/decrease.

A 4-bit counter is used as the up-down counter. By using the analog switches 304 and 305 and establishing the path for outputting the output voltage Vx as it is as the output voltage Vy, lowering of the resolution of the output signal is prevented in case outputting relating to the gradual increase/decrease signal is not performed. By increasing the number of bits of the up/down counter or using an integration circuit including switched capacitors and operational amplifier in the gradual increase/decrease circuit 30, however, the load response control circuit 10 may be formed without especially providing the analog switches 304 and 305.

Figure 11:
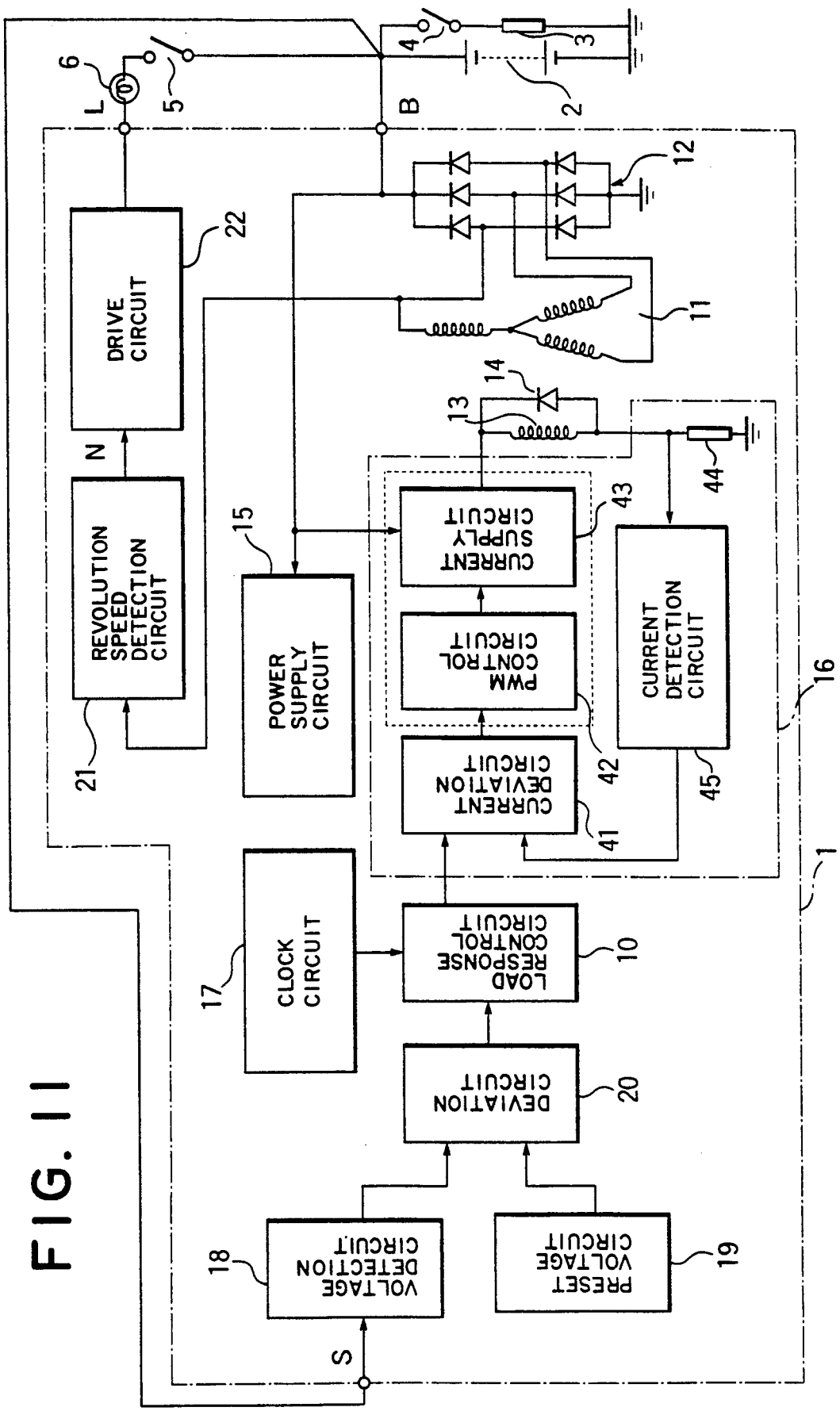
FIG. 11 is a block diagram showing the charging system of an automobile according to a third embodiment of the present invention.

FIG. 11 is a diagram showing the block configuration of a charging system which is another embodiment of the present invention. In FIG. 11, blocks denoted by the same numerals as those of FIG. 2 have basically the same functions as corresponding blocks of FIG. 2. With reference to FIG. 11, numeral 21 denotes a revolution speed detection circuit which detects the revolution speed of the generator 1 from a one-phase voltage of the armature winding, detects the frequency of one-phase voltage having a revolution speed not lower than a predetermined revolution speed such as 1000 r/min, causes its output signal N to become "1", and causes the output signal N to become "0" otherwise. Numeral 22 denotes a drive circuit which comprises power transistors and a drive section for driving them and functions so as to light a charge lamp 6 when the signal N is "0" in the state that a key switch 5 is closed.

The AC waveform obtained from the one-phase voltage of the armature winding may be used as the reference signal of the clock signal.

Further, the current control circuit 16 comprises therein a current deviation circuit 41, a PWM control circuit 42, a current supply circuit 43, a current detection element 44 and a current detection circuit 45. The current control circuit 16 is adapted to perform feedback control of the current flowing through the field winding 13. By using the circuit shown in FIG. 3 or FIG. 7 as the load response control circuit 10 in the block configuration shown in FIG. 11, it is possible to control the current flowing through the field winding 13 so that it may coincide with the output of the load response control circuit 10.

In case the current control circuit 16 attempts to control the field current by using the duty control method as shown in FIG. 2 so that the field current may become constant, the field current varies according to the battery voltage even under the same duty. At the time of gradual increase/decrease, therefore, the output of the generator 1 does not agree with the rate of the output of the load response control circuit 10.

If control having current feedback is exercised as in the current control circuit 16 shown in FIG. 11, however, it is possible to control the actual field current so as to make it agree with the command of gradual increase/decrease. In the present embodiment, therefore, control of the output of the generator 1 with high precision becomes possible. As a result, the rate of gradual increase/decrease of the drive torque can be easily adjusted to a desired value, and an output limit in excess of contribution to engine speed control is avoided. Overdischarge or overcharge of the battery 2 at the time of gradual increase/decrease of output can thus be improved.

The temporal change value of duty generated by the PWM control circuit 42 may be detected to compare this temporal change value of the duty with a predetermined value and limit the field current flowing through the field winding 13 when the predetermined value is exceeded.

Further, in all of the above described embodiments, respective means may be implemented by using circuits comprising arithmetic microprocessors.

As heretofore described, the present invention makes it possible to accurately determine that the electric load has become large and control the field current according thereto. It is thus possible to suppress a rise of torque relating to power generation included in the torque generated by the engine, without causing blinking of lamps at the time of idle rotation of the engine or lowering of battery voltage at the time of deceleration, for example.

We claim:

1. A charging generator for a vehicle comprising:
 a field winding rotated by an engine to generate a rotating magnetic field;
 an armature winding responsive to said rotating magnetic field to generate a current and charge a battery via a rectifier;
 first comparison means for comparing one of a voltage of said battery and a voltage of said rectifier with a first predetermined value;
 current control means for controlling a field current supplied to said field winding on the basis of an output of said first comparison means;
 voltage change rate detection means for detecting a rate of change of said one of said battery voltage and said rectifier voltage; and load response control means for suppressing a sudden change in said field current by controlling said field current to change gradually when said voltage change rate detected by said voltage change rate detection means exceeds a second predetermined value.

2. A charging generator for a vehicle comprising:
a field winding rotated by an engine to generate a rotating magnetic field;
an armature winding responsive to said rotating magnetic field to generate a current and charge a battery via a rectifier;
first comparison means for comparing one of a voltage of said battery and a voltage of said rectifier with a first predetermined value;
current control means for controlling a field current supplied to said field winding on the basis of an output of said first comparison means;
field current change rate detection means for detecting a rate change of said field current; and
load response control means for suppressing a sudden change in said field current by controlling said field current to change gradually when said field current change rate detected by said field current change rate detection means exceeds a second predetermined value.

3. A charging generator for a vehicle comprising:
a field winding rotated by an engine to generate a rotating magnetic field;
an armature winding responsive to said rotating magnetic field to generate a current and charge a battery via a rectifier;
first comparison means for comparing one of a voltage of said battery and a voltage of said rectifier with a first predetermined value;
current control means for controlling a duty factor of a field current supplied to said field winding on the basis of an output of said first comparison means;
duty factor change rate detection means for detecting a rate of change of said duty factor of said field current; and
load response control means for suppressing a sudden change in said field current by controlling said field current to change gradually when said duty factor change rate detected by said duty factor change rate detection means exceeds a second predetermined value.

4. A charging generator for a vehicle comprising:
a field winding rotated by an engine to generate a rotating magnetic field;
an armature winding responsive to said rotating magnetic field to generate a current and charge a battery via a rectifier;
current control means for detecting one of a voltage of said battery and a voltage of said rectifier, and for controlling a filed current supplied to said field winding such that said detected voltage is substantially equal to a first predetermined value;
control variable change rate detection means for detecting a rate of change of at least one control variable controlled by said current control means in the process of controlling said field current such that said detected voltage is substantially equal to said first predetermined value; and
load response control means for suppressing a sudden change in said field current by controlling said field current to change gradually when said control variable change rate detected by said control variable change rate detection means exceeds a second predetermined value.

5. A charging generator for a vehicle according to claim 1, further comprising:
engine speed detection means for detecting a number of revolutions of the engine; and
engine speed comparison means for comparing said detected number of revolutions of the engine with a predetermined number of revolutions;
wherein said load response control means also suppresses a sudden change in said field current by controlling said field current to change gradually on the basis of an output of said engine speed comparison means.

6. A charging generator for a vehicle according to claim 2, further comprising:
engine speed detection means for detecting a number of revolutions of the engine; and
engine speed comparison means for comparing said detected number of revolutions of the engine with a predetermined number of revolutions;
wherein said load response control means also suppresses a sudden change in said field current by controlling said field current to change gradually on the basis of an output of said engine speed comparison means.

7. A charging generator for a vehicle according to claim 3, further comprising:
engine speed detection means for detecting a number of revolutions of the engine; and
engine speed comparison means for comparing said detected number of revolutions of the engine with a predetermined number of revolutions;
wherein said load response control means also suppresses a sudden change in said field current by controlling said field current to change gradually on the basis of an output of said engine speed comparison means.

8. A charging generator for a vehicle according to claim 4, further comprising:
engine speed detection means for detecting a number of revolutions of the engine; and
engine speed comparison means for comparing said detected number of revolutions of the engine with a predetermined number of revolutions;
wherein said load response control means also suppresses a sudden change in said field current by controlling said field current to change gradually on the basis of an output of said engine speed comparison means.

9. A charging generator for a vehicle according to claim 5, further comprising:
second comparison means for comparing said battery voltage with a third predetermined value;
wherein said load response control means refrains from suppressing a sudden change in said field current on the basis of an output of said second comparison means.

10. A charging generator for a vehicle according to claim 6, further comprising:
second comparison means for comparing said battery voltage with a third predetermined value;
wherein said load response control means refrains from suppressing a sudden change in said field current on the basis of an output of said second comparison means.

11. A charging generator for a vehicle according to claim 7, further comprising:

second comparison means for comparing said battery voltage with a third predetermined value;

wherein said load response control means refrains from suppressing a sudden change in said field current on the basis of an output of said second comparison means.

12. A charging generator for a vehicle according to claim 8, further comprising:

second comparison means for comparing said battery voltage with a third predetermined value;

wherein said load response control means refrains from suppressing a sudden change in said field current an output of said comparison means.

13. A charging generator for a vehicle according to claim 1, wherein said load response control means suppresses both a sudden rise and a sudden fall in said field current.

14. A charging generator for a vehicle according to claim 2, wherein said load response control means suppresses both a sudden rise and a sudden fall in said field current.

15. A charging generator for a vehicle according to claim 3, wherein said load response control means suppresses both a sudden rise and a sudden fall in said field current.

16. A charging generator for a vehicle according to claim 4, wherein said load response control means suppresses both a sudden rise and a sudden fall in said field current.

17. A charging generator for a vehicle according to claim 1, wherein said current control means includes PWM control means for performing PWM control of said field current on the basis of the output of said first comparison means.

18. A charging generator for a vehicle according to claim 17, further comprising:

field current detection means for detecting said field current;

wherein said PWM control means performs PWM control of said field current on the basis of the output of said first comparison means and an output of said field current detection means.

19. A charging generator for a vehicle according to claim 1, wherein said load response control means includes:

a clock circuit for generating a clock signal at a predetermined time interval;

a counter which changes its count in response to said clock signal; and means for suppressing a sudden change in said field current by controlling said field current to have a value corresponding to the count of said counter when said voltage change rate detected by said voltage change rate detection means exceeds said second predetermined value.

20. A charging generator for a vehicle according to claim 2, wherein said load response control means includes:

a clock circuit for generating a clock signal at a predetermined time interval;

a counter which changes its count in response to said clock signal; and means for suppressing a sudden change in said field current by controlling said field current to have a value corresponding to the count of said counter when said voltage change rate detected by said voltage field current change rate detection means exceeds said second predetermined value.

21. A charging generator for a vehicle according to claim 3, wherein said load response control means includes:

a clock circuit for generating a clock signal at a predetermined time interval;

a counter which changes its count in response to said clock signal; and means for suppressing a sudden change in said field current by controlling said field current to have a value corresponding to the count of said counter when said voltage change rate detected by said duty factor change rate detection means exceeds said second predetermined value.

22. A charging generator for a vehicle according to claim 4, wherein said load response control means includes:

a clock circuit for generating a clock signal at a predetermined time interval;

a counter which changes its count in response to said clock signal; and means for suppressing a sudden change in said field current by controlling said field current to have a value corresponding to the count of said counter when said control variable change rate detected by said control variable change rate detection means exceeds said second predetermined value.

23. A charging generator for a vehicle according to claim 19, wherein said voltage change rate detection means includes:

count direction determination means for determining a count direction of said counter on the basis of said output of said first comparison means; and means for detecting a rate of change of said one of said battery voltage and said rectifier voltage on the basis of said count direction determined by said count direction determination means.

24. A charging generator for a vehicle according to claim 20, wherein said field current change rate detection means includes:

count direction determination means for determining a count direction of said counter on the basis of said output of said first comparison means; and means for detecting a rate of change of said field current on the basis of said count direction determined by said count direction determination means.

25. A charging generator for a vehicle according to claim 21, wherein said duty factor change rate detection means includes:

count direction determination means for determining a count direction of said counter on the basis of said output of said first comparison means; and means for detecting a rate of change of said duty factor on the basis of said count direction determined by said count direction determination means.

26. A charging generator for a vehicle according to claim 22, wherein said control variable change rate detection means includes:

count direction determination means for determining a count direction of said counter on the basis of said output of said first comparison means; and means for detecting a rate of change of said control variable on the basis of said count direction determined by said count direction determination means.

27. A charging generator for a vehicle according to claim 19, wherein said clock circuit includes means for changing said predetermined time interval at which said clock signal is generated in accordance with a change in said battery voltage.

28. A charging generator for a vehicle according to claim 20, wherein said clock circuit includes means for changing said predetermined time interval at which said clock signal is generated in accordance with a change in said battery voltage.

29. A charging generator for a vehicle according to claim 21, wherein said clock circuit includes means for changing said predetermined time interval at which said clock signal is generated in accordance with a change in said battery voltage.

30. A charging generator for a vehicle according to claim 22, wherein said clock circuit includes means for changing said predetermined time interval at which said clock signal is generated in accordance with a change in said battery voltage.

31. A charging generator for a vehicle comprising:
a field winding rotated by an engine to generate a rotating magnetic field;
an armature winding responsive to said rotating magnetic field to generate a current and charge a battery via a rectifier;
current control means for detecting one of a voltage of said battery and a voltage of said rectifier and for controlling a field current supplied to said field winding such that said detected voltage is substantially equal to a first predetermined value;
control variable change detection means for detecting a change in at least one control variable controlled by said current control means in the process of controlling said field current such that detected voltage is substantially equal to said first predetermined value;
control variable change rate detection means for delaying an output of said control variable change detection means by a predetermined time for detecting a rate of change of said at least one control variable on the basis of the delayed output of said control variable change detection means and said output of said control variable change detection means; and
load response control means for suppressing a sudden change in said field current by controlling said field current to change gradually when said control variable change rate detected by said control variable change rate detection means exceeds a second predetermined value.

32. A charging generator for a vehicle comprising:
a field winding rotated by an engine to generate a rotating magnetic field;
an armature winding responsive to said rotating magnetic field to generate a current and charge a battery via a rectifier;
voltage comparison means for comparing a voltage of the battery with a predetermined value;
a clock generator for generating at least two clock signals having mutually different periods;
a controllable logic circuit receiving the at least two clock signals and outputting a selected one of the at least two clock signals;
an up/down counter which changes its count in response to the selected clock signal from the logic circuit and outputs a digital signal representing its count;
a digital-to-analog converter for converting the digital signal from the up/down counter to an analog signal;
a comparator for comparing an output of the voltage comparison means with the analog signal from the digital-to-analog converter;
means for controlling the logic circuit to output one of the at least two clock signals having a longer period when the logic circuit has been outputting another one of the at least two clock signals having a shorter period and an output of the comparator has remained unchanged for a period of time equal to at least twice the shorter period; and
current control means for controlling a field current supplied to the field winding on the basis of the analog signal from the digital-to-analog converter.

* * * * *